United States Patent [19]
Jurenz et al.

[11] 4,182,564
[45] Jan. 8, 1970

[54] FOCUSING SCREEN FOR PHOTOGRAPHIC CAMERAS

[75] Inventors: Rolf Jurenz; Horst Kodalle, both of Dresden, Fed. Rep. of Germany

[73] Assignee: VEB Pentacon Dresden Kamera und Kinowerke, Dresden, Fed. Rep. of Germany

[21] Appl. No.: 930,126

[22] Filed: Aug. 1, 1978

[30] Foreign Application Priority Data

Aug. 22, 1977 [DE] Fed. Rep. of Germany ....... 2006730

[51] Int. Cl.² .......................... G02B 5/04; G03B 13/28
[52] U.S. Cl. ..................................... 354/200; 350/286
[58] Field of Search ................ 354/25, 199, 200, 201, 354/151, 152, 155; 350/286

[56] References Cited
U.S. PATENT DOCUMENTS

| | | | |
|---|---|---|---|
| 3,149,547 | 9/1964 | Jurenz | 354/199 X |
| 3,233,533 | 2/1966 | Sauer | 354/152 X |
| 3,500,736 | 3/1970 | Ewald | 354/152 X |
| 3,602,085 | 8/1971 | Wagner | 350/286 X |
| 4,003,637 | 1/1977 | Masuoka | 350/286 |

*Primary Examiner*—Donald A. Griffin
*Attorney, Agent, or Firm*—William A. Drucker

[57] ABSTRACT

The invention relates to a focusing screen for photographic cameras with split-image range finder, of which the wedges lying side by side are inclined oppositely to one another and extend obliquely of the lateral edges of the focusing screen.

Known focusing screens of this kind each have a pair of coincidence wedges inclined oppositely at equal angles. In order that horizontal and vertical contours can be used for focusing, the single line of intersection between the coincidence wedge pair is arranged obliquely in relation to the lateral edges of the focusing screen. In comparison with a wedge pair with horizontal or vertical line of intersection, as a result of this oblique arrangement of the intersection line the accuracy of measurement reduces.

In accordance with the invention this is achieved in that on both sides of a central wedge there are provided lateral wedges inclined oppositely thereto which have the same angle of inclination as one another. Due to this arrangement one obtains at least two intersection lines extending parallel and with spacing from one another, so that the accuracy of measurement is increased for the same physiological perception threshold of the photographer.

3 Claims, 7 Drawing Figures

FOCUSING SCREEN FOR PHOTOGRAPHIC CAMERAS

BACKGROUND TO THE INVENTION

The invention relates to a focusing screen for photographic cameras with split-image range finder, of which the wedges lying side by side are inclined oppositely to one another and extend obliquely of the lateral edges of the focusing screen.

STATEMENT OF PRIOR ART

Known focusing screens of this kind each have a pair of coincidence wedges inclined oppositely at equal angles. In order that horizontal and vertical contours can be used for focusing, the single line of intersection between the coincidence wedge pair is arranged obliquely in relation to the lateral edges of the focusing screen. In comparison with a wedge pair with horizontal or vertical line of intersection, as a result of this oblique arrangement of the intersection line the accuracy of measurement reduces.

It was possible to counter this reduction of the accuracy of measurement by making the angle of inclination of the coincidence wedges larger. Nevertheless when only one coincidence wedge pair is used, only one single line of intersection remains for the observation of the picture contours in focusing.

OBJECT OF THE INVENTION

With the aim of improving the accuracy of measurement it is the task of the invention to produce a new arrangement of coincidence wedges.

SUMMARY OF THE INVENTION

In accordance with the invention this is achieved in that on both sides of a central wedge there are provided lateral wedges inclined oppositely thereto which have the same angle of inclination as one another. Due to this arrangement one obtains at least two intersection lines extending parallel and with spacing from one another, so that the accuracy of measurement is increased for the same physiological perception threshold of the photographer. The angle of inclination of the central wedge expediently has the same absolute value as the angle of inclination of the lateral wedges.

BRIEF DESCRIPTION OF DRAWINGS

The invention is explained by reference to illustrated and described examples of embodiment.

DESCRIPTION OF PREFERRED EMBODIMENT

Figure 1:
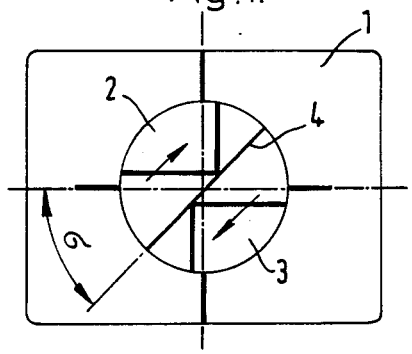
FIG. 1 shows the arrangement of a known coincidence wedge pair.
Figure 2:
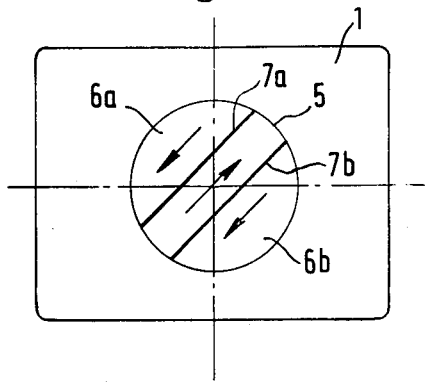
FIG. 2 shows an arrangement according to the invention of coincidence wedges.
Figures 3, 3A:
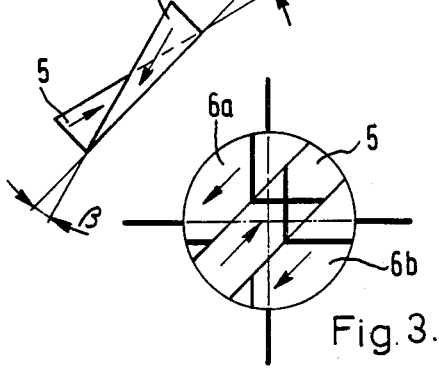
FIG. 3 shows a first measurement image.
FIG. 3a shows the lateral elevation of FIG. 3.

In known coincidence wedge pairs 2, 3 (see FIG. 1) arranged in focusing screens only a single contour stagger is achieved by the single line 4 of intersection. According to the present invention in the focusing screen 1 there is provided the central wedge 5 inclined in one direction which is flanked by lateral wedges 6a and 6b inclined in the opposite direction. The lateral wedges 6a and 6b have the inclination angle $\beta$, while the central wedge 5 is inclined by the angle $\alpha$ (see FIG. 3a); in the present example of embodiment the angles of inclination $\alpha$ and $\beta$ are made of equal size.

Figure 4:
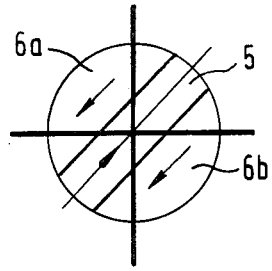
FIG. 4 shows a second measurement image.

As a result of this arrangement two intersection lines 7a and 7b occur between the central wedge 5 and the two lateral wedges 6a and 6b. In this way a doubled contour stagger is achieved (see FIG. 3), as soon as a setting not corresponding to the focusing condition is effected. The focusing condition is made clearly visible to the photographer as illustrated in FIG. 4.

Figure 5:
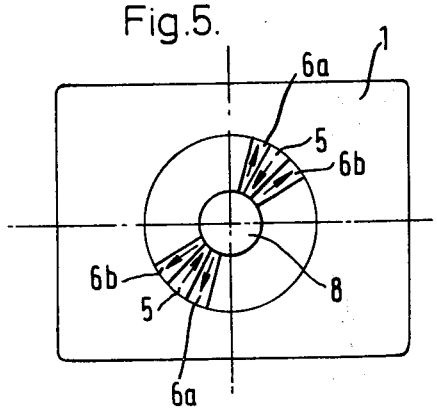
FIG. 5 and 6 show coincidence wedges arranged in accordance with the invention diametrically around a central zone.
Figure 6:
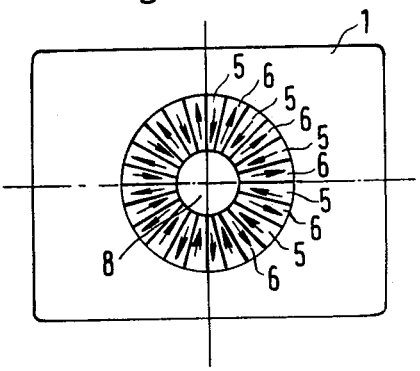

In the case of an arrangement according to FIG. 5, opposite central wedges 5 and lateral wedges 6a and 6b, occupying only a part of the circumference of the central zone 8, are diametrically allocated to a central zone 8 of the focusing screen 1. According to FIG. 6 central wedges 5 and lateral wedges 6 are arranged distributed in radial form over the entire circumference of the central zone 8.

We claim:

1. A focusing screen for photographic cameras with split-image range finder, comprising:
    (a) a central wedge extending obliquely of the lateral edges of the focusing screen, and
    (b) lateral wedges lying one on each side of said central wedge and inclined oppositely thereto, the surface of which lateral wedges have the same angle of inclination as each other.

2. A focusing screen according to claim 1, wherein the angle of inclination of the central wedge has the same absolute value as the angle of inclination of the lateral wedges.

3. A focusing screen according to claim 1, wherein mutually diametrically opposite central wedges and lateral wedges are arranged in radial form around a central zone.

* * * * *